United States Patent
Wang et al.

(10) Patent No.: US 9,331,942 B2
(45) Date of Patent: May 3, 2016

(54) APPARATUS AND METHOD FOR PROCESSING ALTERNATELY CONFIGURED LONGEST PREFIX MATCH TABLES

(71) Applicant: Xpliant, Inc., San Jose, CA (US)

(72) Inventors: Weihuang Wang, Los Gatos, CA (US); Mohan Balan, Santa Clara, CA (US); Nimalan Siva, San Ramon, CA (US); Zubin Shah, Santa Clara, CA (US)

(73) Assignee: Xpliant, Inc., San Jose, CA (US)

( * ) Notice: Subject to any disclaimer, the term of this patent is extended or adjusted under 35 U.S.C. 154(b) by 216 days.

(21) Appl. No.: 14/194,567

(22) Filed: Feb. 28, 2014

(65) Prior Publication Data

US 2014/0269723 A1     Sep. 18, 2014

Related U.S. Application Data

(60) Provisional application No. 61/778,293, filed on Mar. 12, 2013.

(51) Int. Cl.
  *H04L 12/28*  (2006.01)
  *H04L 12/745* (2013.01)
  *H04L 12/753* (2013.01)

(52) U.S. Cl.
  CPC ............. *H04L 45/748* (2013.01); *H04L 45/48* (2013.01)

(58) Field of Classification Search
  CPC .............. H04L 29/0653; H04L 29/06095; H04L 49/3009; H04L 49/309; H04L 45/74
  See application file for complete search history.

(56) References Cited

U.S. PATENT DOCUMENTS

| | | | | |
|---|---|---|---|---|
| 6,141,738 A * | 10/2000 | Munter | ............. | H04L 29/12009 370/389 |
| 7,019,674 B2 * | 3/2006 | Cadambi | ........... | G06F 17/30949 341/106 |
| 7,111,071 B1 * | 9/2006 | Hooper | ................... | H04L 45/00 370/395.32 |
| 7,724,734 B1 * | 5/2010 | Grosser | ................... | H04L 45/02 370/389 |
| 7,827,218 B1 * | 11/2010 | Mittal | ............... | G06F 17/30321 370/389 |
| 2001/0042130 A1 * | 11/2001 | Brown | ............. | G06F 17/30955 709/238 |
| 2010/0293327 A1 * | 11/2010 | Lin | ..................... | H04L 45/7457 711/108 |
| 2011/0082866 A1 * | 4/2011 | Brown | ..................... | H04L 45/00 707/744 |
| 2012/0243539 A1 * | 9/2012 | Keesara | ................... | H04L 45/66 370/392 |

* cited by examiner

*Primary Examiner* — Hassan Phillips
*Assistant Examiner* — Siren Wei
(74) *Attorney, Agent, or Firm* — Cooley LLP (57) ABSTRACT

A network switch includes a memory configurable to store alternate table representations of an individual trie in a hierarchy of tries. A prefix table processor accesses in parallel, using an input network address, the alternate table representations of the individual trie and searches for a longest prefix match in each alternate table representation to obtain local prefix matches. The longest prefix match from the local prefix matches is selected. The longest prefix match has an associated next hop index base address and offset value. A next hop index processor accesses a next hop index table in the memory utilizing the next hop index base address and offset value to obtain a next hop table pointer. A next hop processor accesses a next hop table in the memory using the next hop table pointer to obtain a destination network address.

14 Claims, 9 Drawing Sheets

FIG. 1
(Prior Art)

Forwarding Table 200

| Prefix | Next Hop |
|--------|----------|
| *      | A        |
| 0*     | C        |
| 011*   | D        |
| 1010*  | F        |
| 11010* | G        |

| Type | Mode | Branch Length | Stride | NHI Base Address | Branch ID | Trie Node IDs |
|---|---|---|---|---|---|---|
| IPV4 | Sparse | X | 5 | XY | ABC | A, B, C |

FIG. 8

| Type | Mode | Branch Length | Stride | NHI Base Address | Branch ID | Trie Bit Map |
|---|---|---|---|---|---|---|
| IPV6 | Bit Map | X | 5 | XY | ABC | 31 Bit Map |

FIG. 9

| Type | Mode | Branch Length | Stride | NHI Base Address | Branch ID | Trie Bottom Bit Map |
|---|---|---|---|---|---|---|
| IPV4 | Leaf-Push | X | 5 | XY | ABC | 16 Bit Map |

FIG. 10

| NHI Table |
| --- |
|  |
| Pointer to NH Table Plus Block Size |
|  |
|  |
|  |
|  |
|  |

FIG. 11

| NH Table |
| --- |
| Hop 1 |
| Hop 2 |
| Hop 3 |
| Hop 4 |
| Hop 5 |
| Hop 6 |
| Hop 7 |

FIG. 14

APPARATUS AND METHOD FOR PROCESSING ALTERNATELY CONFIGURED LONGEST PREFIX MATCH TABLES

CROSS-REFERENCE TO RELATED APPLICATION

This application claims priority to U.S. Provisional Patent Application Ser. No. 61/778,293, filed Mar. 12, 2013, the contents of which are incorporated herein by reference.

FIELD OF THE INVENTION

This invention relates generally to processing traffic in a computer network. More particularly, this invention relates to a network switch with alternately configured longest prefix match tables.

BACKGROUND OF THE INVENTION

Figure 1:
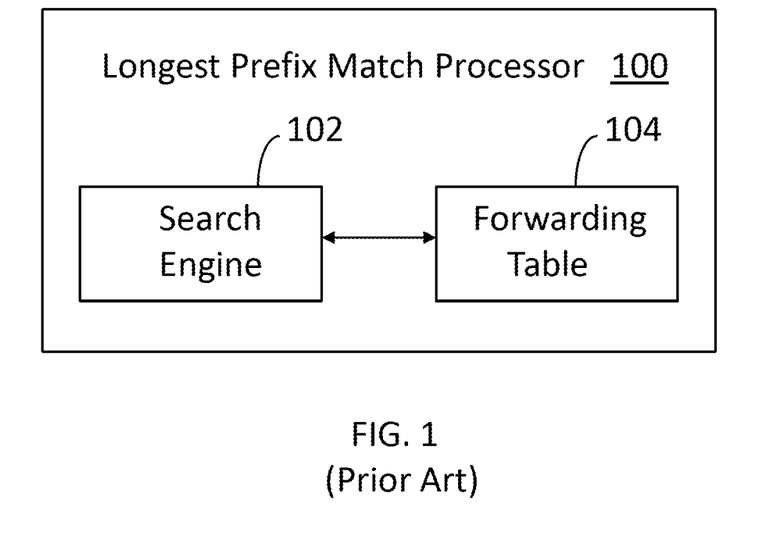
FIG. 1 illustrates a prior art longest prefix match processor.

FIG. 1 illustrates a longest prefix match processor 100 utilized in accordance with the prior art. The longest prefix match processor 100 includes a search engine 102 to find entries in a forwarding table 104. Each entry in the forwarding table has an associated switch identifier, which represents the next destination (hop) for a network packet.

Figure 2:
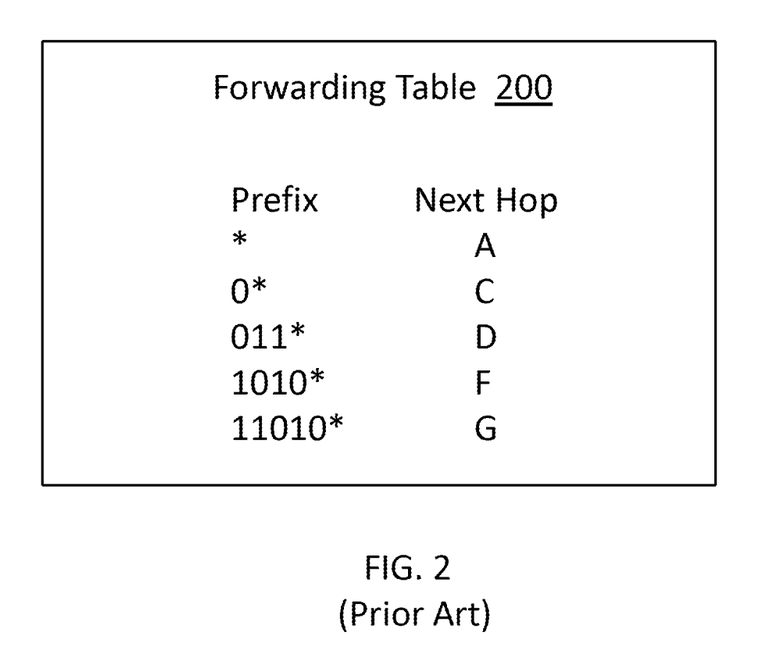
FIG. 2 illustrates a prior art forwarding table.

FIG. 2 illustrates a simplified version of a prior art forwarding table 200. The forwarding table has a prefix column with a set of entries and a next hop column with a designated switch identifier. Each prefix entry is a segment of a network address. The asterisk (*) designates a "do not care" state. If there is no prefix match, then the next hop is designated as switch "A". It is desirable to obtain a match with the prefix that is longest since this represents the most specific path to the target machine.

Figure 3:
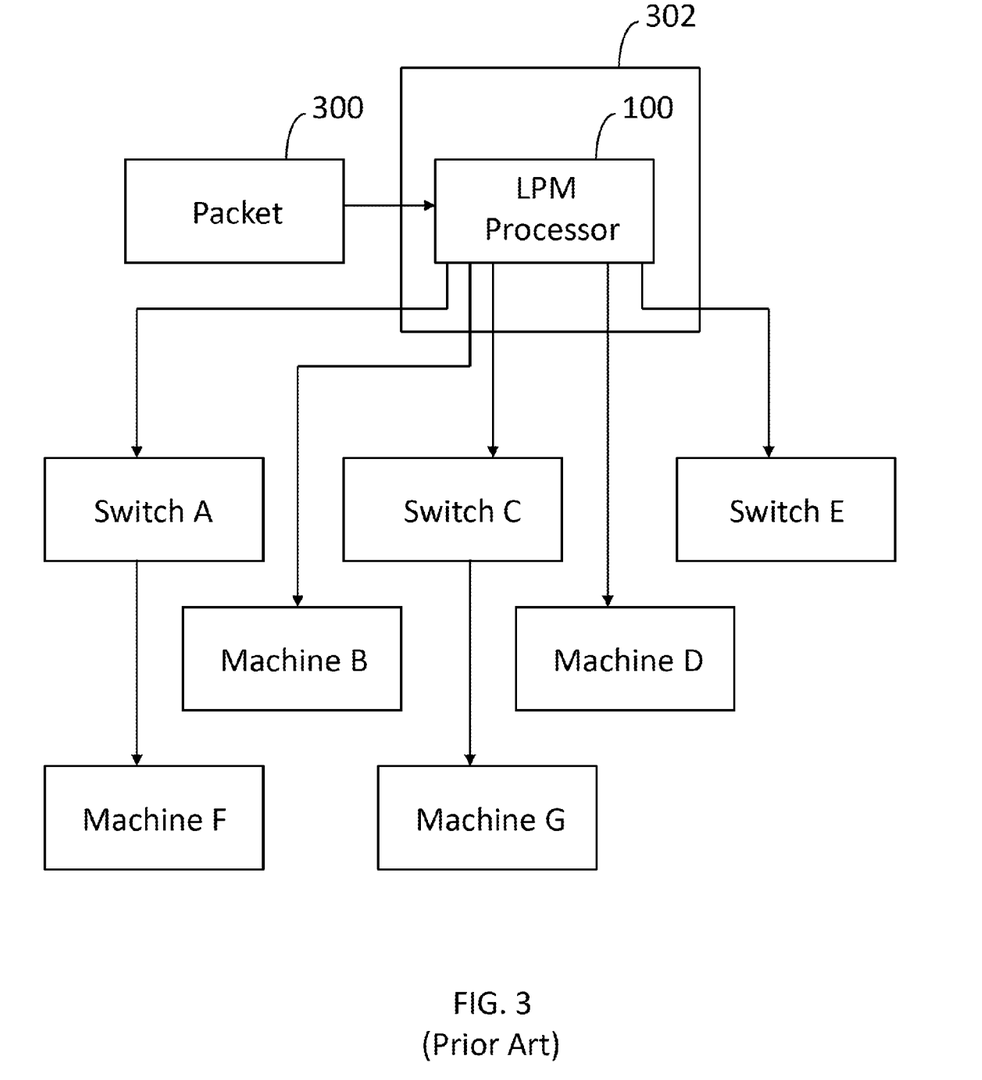
FIG. 3 illustrates a switch with a longest prefix match processor to route a packet to any number of switches or machines.

FIG. 3 illustrates a packet 300 that is received by a switch 302 with a longest prefix match processor 100. The longest prefix match processor generates a hop to another machine, such as switches A, C or E or machines B, D, F or G.

Figure 4:
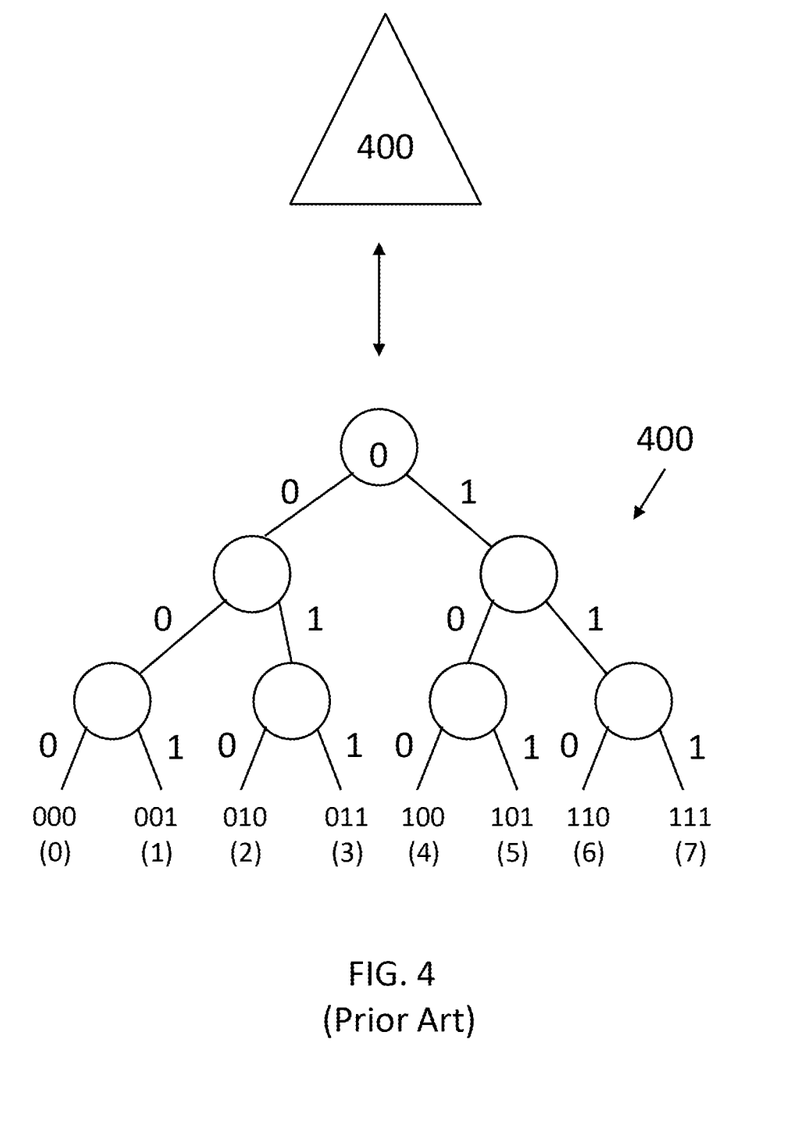
FIG. 4 illustrates a prior art binary tree.

FIG. 4 illustrates a binary tree or trie 400. The top of the figure illustrates a triangle 400, which is a simplified representation of the trie 400 shown at the bottom of the figure. The trie 400 has different paths represented by 0s and 1s, where a 0 represents a path to the left and a 1 represents a path to the right. Using this technique, any path in the trie can be designated with digital values. The bottom of the trie 400 has four leaf nodes, as shown, which can branch to eight destinations (0) through (7). The path to destination (0) is represented as 000, since three left branches are used to get to this location. The path to destination (3) is represented as 011 since one left branch (0) is followed by two right branches (11). In this way, each path may be specified using binary values. Trie 400 has three layers of nodes and therefore is said to have a stride of three.

Figure 5:
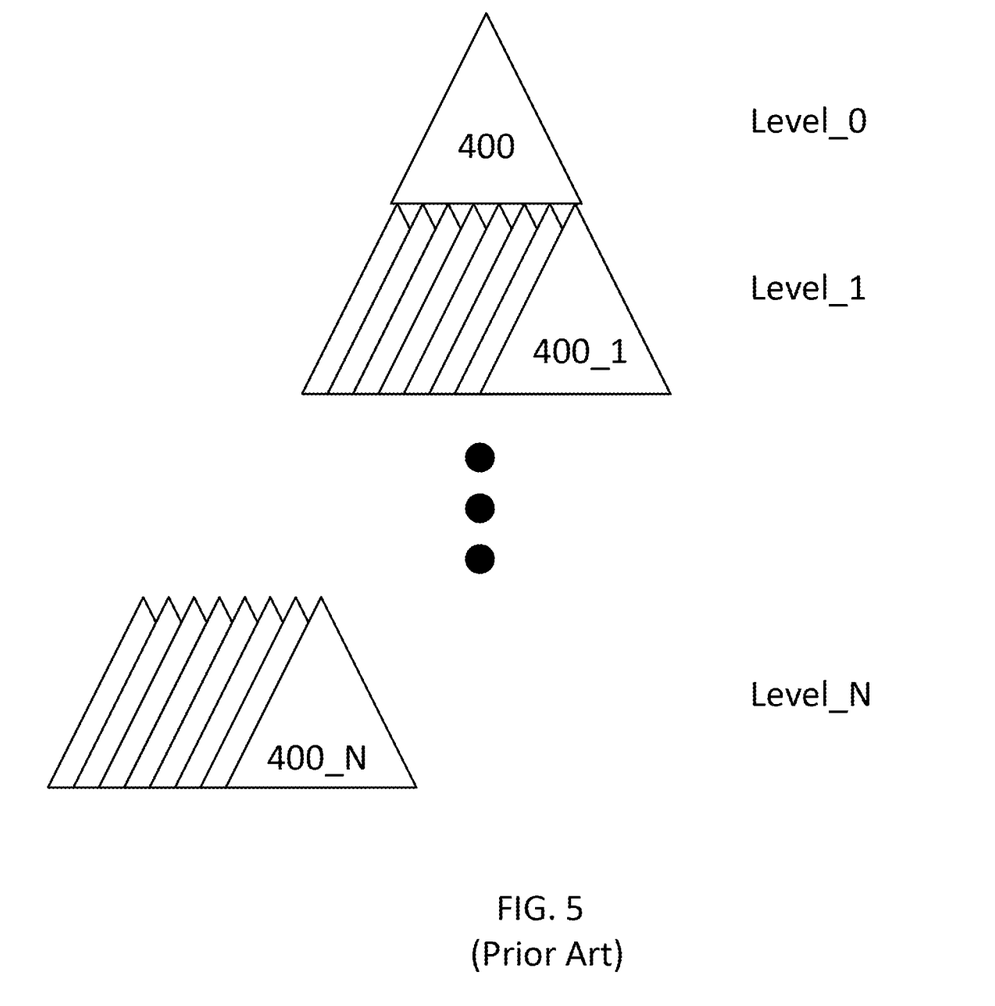
FIG. 5 illustrates a nested configuration of binary trees with arbitrarily complex paths.

FIG. 5 illustrates that the trie 400 may be in an arbitrarily complex hierarchical relationship with many other tries. For example, trie 400 may be considered as level 0 with eight tries beneath it 400_1 through 400_8 at level 1. This trie expansion can proceed for any number of levels, as shown in FIG. 5. Each trie may have a different size. Thus, it can be appreciated that arbitrarily long path expressions may be defined through such a structure.

Figure 6:
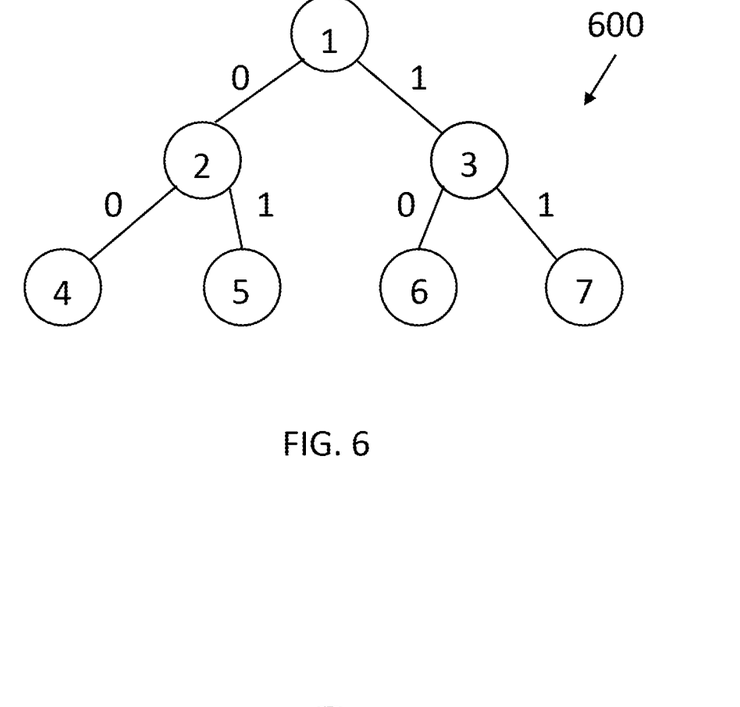
FIG. 6 illustrates node numbers used in accordance with an embodiment of the invention.

FIG. 6 illustrates that each node of a trie 600 may have a designated number. In this example, the nodes are numbered 1 through 7, as shown.

Figure 7:
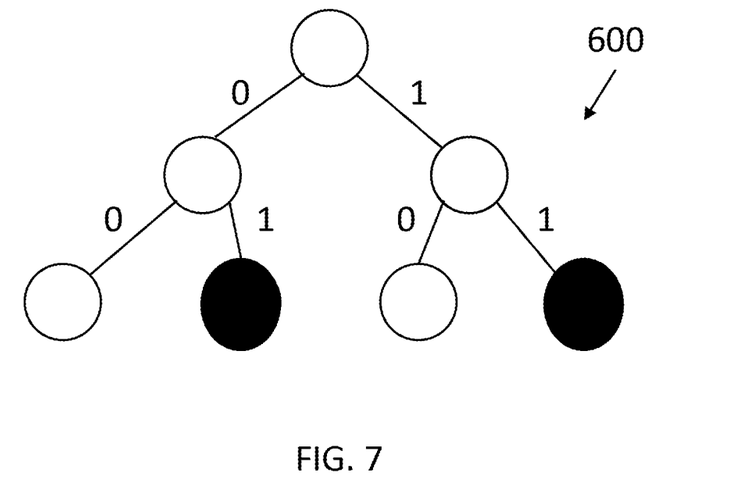
FIG. 7 illustrates a binary tree with next hop information at selected nodes.

FIG. 7 illustrates a scenario where next hop information resides at the dark nodes (nodes 5 and 7). The path to node 5 may be expressed in binary as 01, while the path to node 7 may be expressed in binary as 11. It can be appreciated with reference to FIG. 5 that the node path can traverse multiple levels and the resultant path to a particular node would be expressed with a long binary value.

In view of the foregoing, there is an ongoing need to provide improved techniques for identifying longest prefix matches.

SUMMARY OF THE INVENTION

A network switch includes a memory configurable to store alternate table representations of an individual trie in a hierarchy of tries. A prefix table processor accesses in parallel, using an input network address, the alternate table representations of the individual trie and searches for a longest prefix match in each alternate table representation to obtain local prefix matches. The longest prefix match from the local prefix matches is selected. The longest prefix match has an associated next hop index base address and offset value. A next hop index processor accesses a next hop index table in the memory utilizing the next hop index base address and offset value to obtain a next hop table pointer. A next hop processor accesses a next hop table in the memory using the next hop table pointer to obtain a destination network address.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 8:
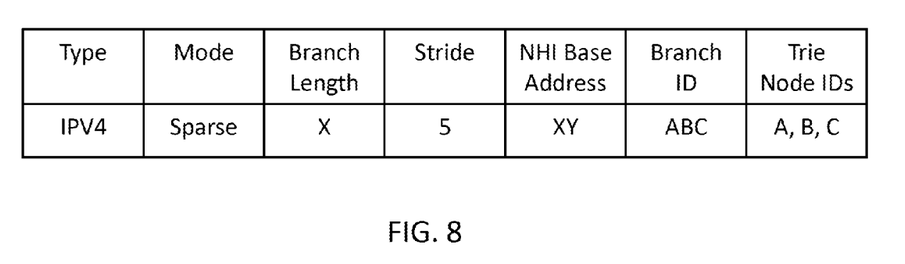
FIG. 8 illustrates a sparse mode table configuration utilized in accordance with an embodiment of the invention.

The invention is a longest prefix match processor embedded in a switch. The longest prefix match processor utilizes alternately configured longest prefix match tables, which may be optimized for different longest prefix match search strategies and memory optimization strategies. One longest prefix match table is shown in FIG. 8. The first column of the table specifies a packet type, in this case IPV4. Advantageously, IPV4 and IPV6 packet types may be efficiently stored in a single table. The next column specifies a storage mode, in this case sparse mode. The sparse mode facilitates a large stride for an individual trie. That is, the sparse mode facilitates processing for configurations in which individual tries are large. The next column specifies a branch length. The branch length is an indicator of the length of a path from a root node of a hierarchical trie to an arbitrary root node of an individual trie, such as an arbitrary trie (also referred to as a sub-trie) in FIG. 5. The stride specifies the size of the trie, such as $2^{stride}$. In this example, the stride is 5 or $2^5$ or 32. The next column is a next hop index base address. The invention utilizes a next hop index for reference to a next hop table. This allows for maximum flexibility in configuring memory resources. The next column of the table is a branch ID, such as a binary representation of a path through a tree, as discussed above. The final column of FIG. 8 specifies trie node IDs with next hop information. FIG. 7 provides an example of trie nodes and corresponding node IDs with next hop information. The first four fields of FIG. 8 have a fixed width. The remaining two fields have a variable width.

Figure 9:
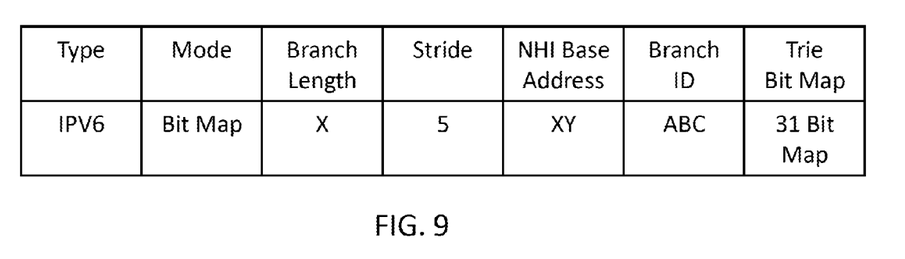
FIG. 9 illustrates a bitmap mode table configuration utilized in accordance with an embodiment of the invention.

FIG. 9 illustrates an alternate configuration for a prefix match table. The first field specifies packet type. The next field specifies a bit map mode. The next field specifies the branch length, as discussed above. The next field specifies the stride. In bit map mode, all nodes for a trie of stride 5 are stored in an array of $2^5-1$ or 31 bits. The next two fields are NHI base address and branch ID. The branch ID specifies the branch path, as discussed above. The NHI base address specifies a base position corresponding to the least significant bit of the trie bit map, which is marked as 1. The other nodes have their pointers into the NHI table incremented from the base position. For example, if the base position is zero, the fifth bit marked as 1 would be incremented 4 entries from the base position. The final field is the trie bit map. In this example, the trie bit map is a 31 bit map. The bit map specifies different positions in the specified trie that have next hop information.

Figure 10:
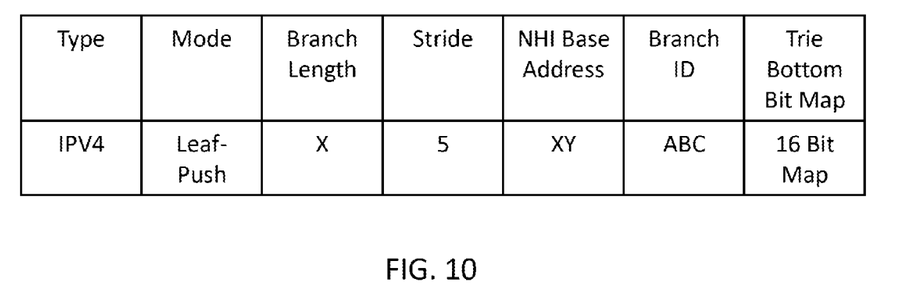
FIG. 10 illustrates a leaf-push mode table configuration utilized in accordance with an embodiment of the invention.

FIG. 10 illustrates an alternate configuration for a prefix match table. The first field specifies a leaf-push mode. In leaf-push mode only the bottom-most nodes are represented in the array. For example, with reference to FIG. 6, only nodes 4, 5, 6 and 7 would be represented in the array. If other nodes of FIG. 6 have next hop information, then various techniques may be used, such as controlled prefix expansion, to position that information in the bottom-most nodes. The NHI table needs to make corresponding duplications in this case. This mode is particularly memory efficient in the case where network addresses for directly-connected hosts are stored in the same table since those hosts typically have contiguous addresses. This mode is also advantageous because all searches terminate at the same level.

The table of FIG. 10 also has a branch length field, a stride field, an NHI base address field, a branch ID field and a trie bottom bit map field. In the case of a stride of 5 the entire bit map has $2^5-1$ or 31 bits, which results in a bottom set of 16 nodes. Thus, a 16 bit map may be used to specify the positions of these different nodes.

Figure 11:
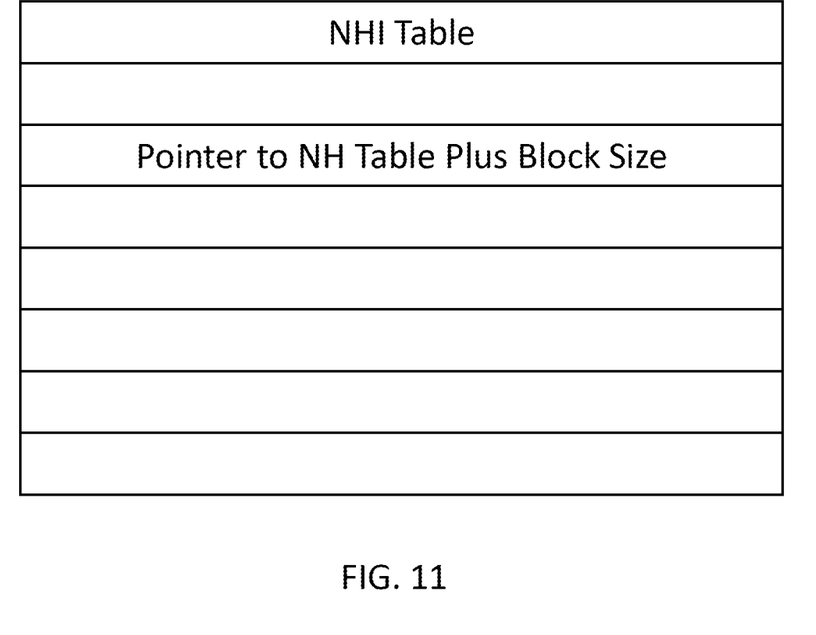
FIG. 11 illustrates a next hop index table utilized in accordance with an embodiment of the invention.

FIG. 11 illustrates a next hop index table. Different entries in the table specify a pointer to a next hop table base position plus a block size offset. The base position specifies the entry point into the table while the block size specifies the additional fields from that base position. Block size of next hop table entries is used for equal-cost multi-path (ECMP) routing, an advanced network routing strategy. Along with IP address, each request to a longest prefix match engine is accompanied by an ECMP hash value for path selection. The ECMP hash value may be larger than the block size available, hence the final path selection is calculated as next hop base address plus input ECMP hash value modulo of next hop block size. In one embodiment, up to 1024 paths are supported for ECMP.

The NHI table size is a function of the trie configuration. The table size can be dynamically configured and optimized.

Figure 12:
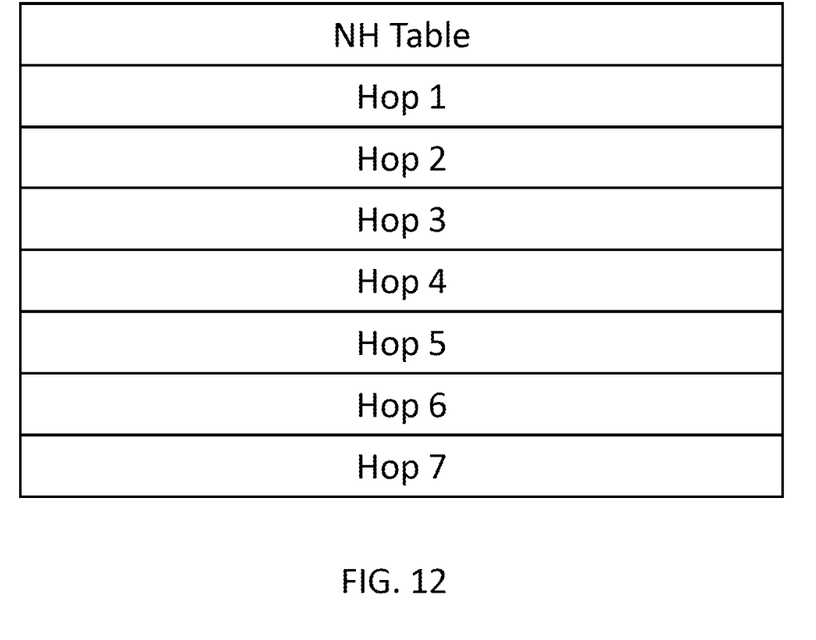
FIG. 12 illustrates a next hop table utilized in accordance with an embodiment of the invention.

FIG. 12 illustrates a next hop table. Each entry in the table specifies a hop to a destination machine.

Figure 13:
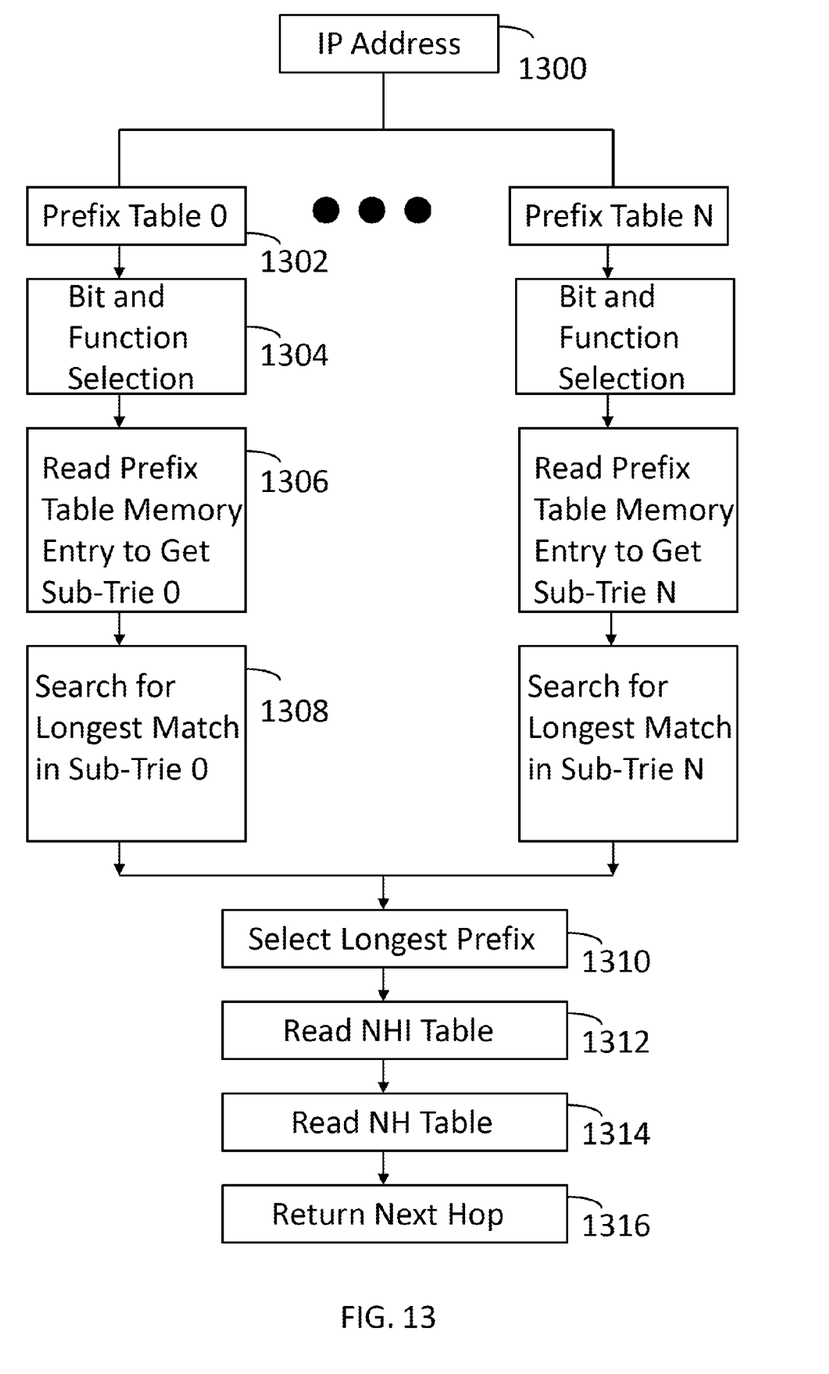
FIG. 13 illustrates packet processing operations performed in accordance with an embodiment of the invention.

FIG. 13 illustrates processing operations performed in accordance with an embodiment of the invention. An ingress network address (e.g., internet protocol address) 1300 is applied to a set of prefix tables 0 through N, all or portions of the tables may be configured by software. Each prefix table contains a set of prefix entries, each of which specifies a path to a trie and then characteristics of that trie, as discussed in connection with FIGS. 8-10. Using prefix table 0 1302 as an example, software configured selection of bits of the ingress network address is applied to a hash function to map to a prefix table address 1304. Advantageously, all matches are done with a fixed latency in hardware. The prefix table memory is then read to get to sub-trie 0 1306 (an individual trie in an arbitrarily complex hierarchical trie structure, such as shown in FIG. 5). A longest prefix match is then performed at that sub-trie 1308. This processing is repeated across all prefix tables 0 through N to create local prefix matches. The results are then processed to select the longest prefix match 1310. The NHI table is then read 1312, which results in an access to the next hop table 1314, which produces a next hop 1316.

Figure 14:
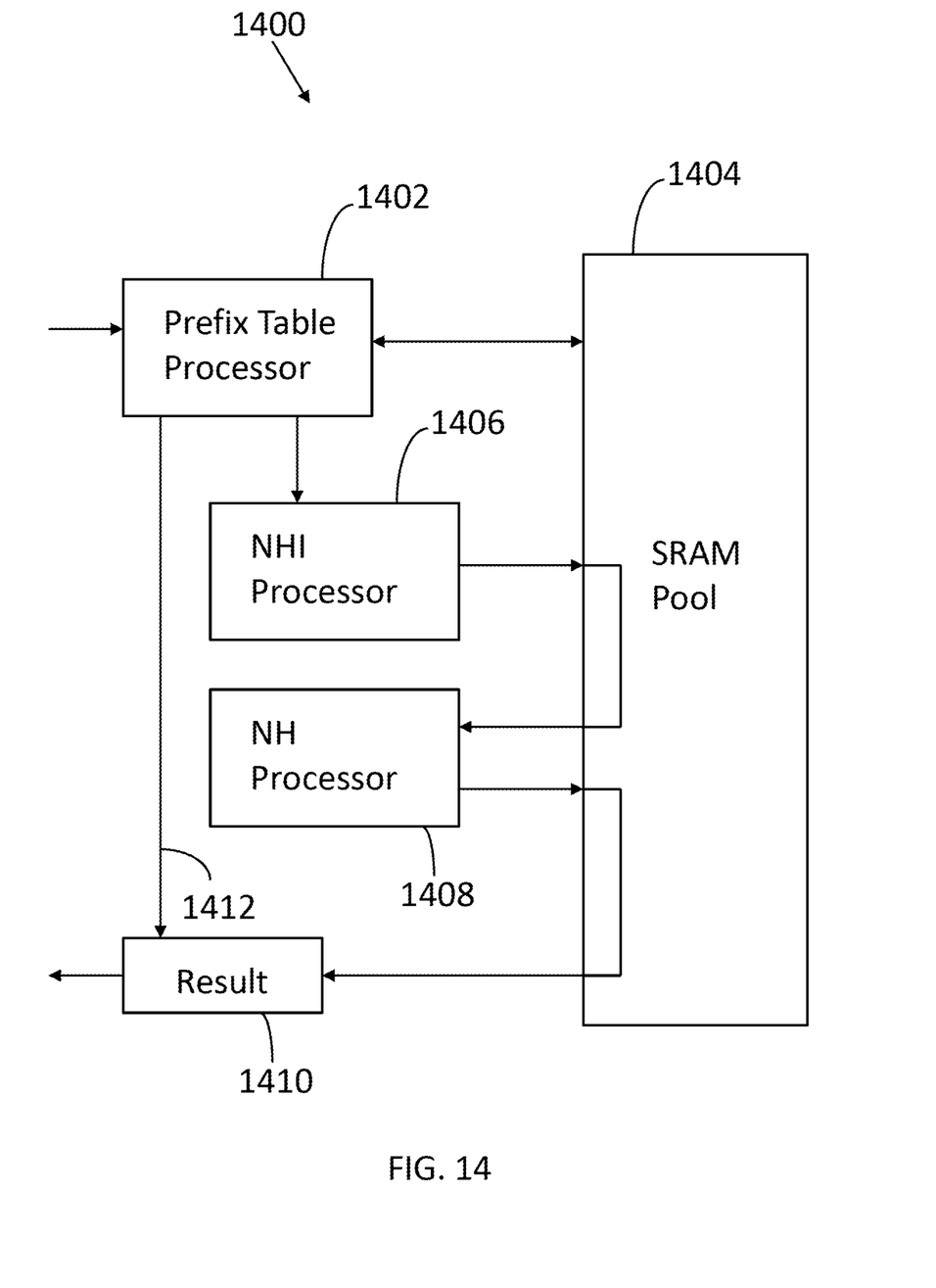
FIG. 14 processing components utilized in accordance with an embodiment of the invention.

FIG. 14 illustrates a longest prefix match processor 1400 configured in accordance with an embodiment of the invention. The processor 1400 includes a prefix table processor 1402, which is a hardware resource configured to specify and then access different longest prefix match tables, such as those in FIGS. 8-10. The tables are resident in memory 1404, which may be a pool of SRAM resources. The prefix table processor 1402 coordinates the operations 1304-1310 of FIG. 13. A next hop index processor 1406 may then be used to access a next hop index table in memory 1404, which returns a base address and offset, if any, to a next hop processor 1408. The next hop processor 1408 accesses a next hop table stored in memory 1404, which produces a next hop address as a result 1410. If the prefix table processor 1402 has a trie miss or other error, an error or default result 1410 may be directly generated, as shown with arrow 1412.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A network switch, comprising:
   a memory configurable to store alternate table representations of an individual trie in a hierarchy of tries, wherein the alternate table representations are optimized for different longest prefix match search strategies and memory optimization strategies;
   a hardware prefix table processor to
      access in parallel, using an input network address, the alternate table representations of the individual trie and search for a longest prefix match in each alternate table representation to obtain local prefix matches,
      select the longest prefix match from the local prefix matches, wherein the longest prefix match has an associated next hop index base address and offset value;
   a next hop index processor to access a next hop index table in the memory utilizing the next hop index base address and offset value to obtain a next hop table pointer; and
   a next bop processor to access a next hop table in the memory using the next hop table pointer to obtain a destination network address.

2. The network switch of claim 1 wherein the alternate table representations include a sparse mode representation that identifies selected trie nodes.

3. The network switch of claim 2 wherein the sparse mode representation includes a branch identification and a stride value.

4. The network switch of claim 1 wherein the alternate table representations include a bit map mode representation with a bit map that identifies selected trie nodes.

5. The network switch of claim 4 wherein the bit map mode representation includes a branch identification and a stride value.

6. The network switch of claim 1 wherein the alternate table representations include a leaf-push representation that identifies selected trie nodes at the bottom of a trie.

7. The network switch of claim 6 wherein the leaf-push representation includes branch identification and a stride value.

8. The network switch of claim 1 wherein the prefix table processor is a hardware resource with a deterministic look-up latency.

9. The network switch of claim 1 wherein the alternate table representations include tables with different packet types in the same table.

10. The network switch of claim 9 wherein the different packet types includes IPV4 packets and IPV6 packets.

11. The network switch of claim 1 wherein the prefix table processor identifies a longest prefix match for a remote host and an exact match for a directly attached host.

12. The network switch of claim 11 wherein the prefix table processor identifies the longest prefix match for the remote host and the exact match for the directly attached host in the same table.

13. The network switch of claim 1 wherein the next hop index processor processes a block of next hop table entries to facilitate equal-cost multi-path routing.

14. The network switch of claim 13 wherein the block specifies up to 1024 paths.

* * * * *